United States Patent
Chen et al.

(10) Patent No.: US 9,318,288 B2
(45) Date of Patent: Apr. 19, 2016

(54) POWER SAVING METHOD AND POWER SAVING CIRCUIT THEREOF

(71) Applicant: Wistron Corporation, New Taipei (TW)

(72) Inventors: Chien-Liang Chen, New Taipei (TW); Chin-Min Liu, New Taipei (TW)

(73) Assignee: Wistron Corporation, Hsichih, New Taipei (TW)

(*) Notice: Subject to any disclaimer, the term of this patent is extended or adjusted under 35 U.S.C. 154(b) by 569 days.

(21) Appl. No.: 13/732,446

(22) Filed: Jan. 2, 2013

(65) Prior Publication Data
US 2013/0300216 A1    Nov. 14, 2013

(30) Foreign Application Priority Data

May 11, 2012    (TW) .................................. 101116843

(51) Int. Cl.
*H02J 1/00* (2006.01)
*H02M 3/00* (2006.01)
*H01H 47/00* (2006.01)
*H02M 1/00* (2007.01)

(52) U.S. Cl.
CPC ............. *H01H 47/00* (2013.01); *H02M 3/00* (2013.01); *H02M 2001/0032* (2013.01); *H02M 2001/0045* (2013.01); *Y02B 70/16* (2013.01); *Y10T 307/865* (2015.04)

(58) Field of Classification Search
CPC ................... H01H 47/00; H02M 3/00; H02M 2001/0032; H02M 2001/0045; Y10T 307/865; Y02B 70/16
USPC .................................................... 307/82, 131
See application file for complete search history.

(56) References Cited

U.S. PATENT DOCUMENTS

| | | | |
|---|---|---|---|
| 6,713,995 B2 | 3/2004 | Chen | |
| 7,148,665 B2 * | 12/2006 | Agari | G06F 1/565 323/268 |
| 7,230,408 B1 * | 6/2007 | Vinn | H02M 3/156 323/273 |
| 7,923,975 B2 | 4/2011 | Liu | |
| 8,067,925 B2 * | 11/2011 | Grimm | H02M 3/156 323/272 |

(Continued)

FOREIGN PATENT DOCUMENTS

| CN | 1477775 A | 2/2004 |
|---|---|---|
| CN | 101018018 A | 8/2007 |

(Continued)

OTHER PUBLICATIONS

Office action mailed on Jul. 25, 2014 for the Taiwan application No. 101116843, filing date: May 11, 2012, p. 1 line 1-2, p. 2-3 and p. 4 line 1-9.

(Continued)

*Primary Examiner* — Hal Kaplan
(74) *Attorney, Agent, or Firm* — Winston Hsu; Scott Margo

(57) ABSTRACT

A power saving circuit for an electronic device is disclosed. The power saving circuit includes a direct-current (DC) power supply, a sensing unit, and a control unit. The DC power supply is used for providing a DC current. The sensing unit, coupled to the DC power supply, is used for detecting the DC current and operating to generate a voltage signal according to the DC current. The control unit, coupled to the sensing unit, is used for determining whether a system circuit of the electronic device has a light load or a heavy load and generating an enable signal.

8 Claims, 3 Drawing Sheets

(56) References Cited

U.S. PATENT DOCUMENTS

| | | | |
|---|---|---|---|
| 8,076,913 B2 * | 12/2011 | Kuan | 323/243 |
| 8,274,267 B2 * | 9/2012 | Grimm | H02M 3/156 323/272 |
| 8,547,057 B2 * | 10/2013 | Dunworth et al. | 320/108 |
| 8,559,196 B2 * | 10/2013 | Yang et al. | 363/21.12 |
| 2010/0232187 A1 | 9/2010 | Yang | |
| 2011/0109288 A1 | 5/2011 | Lee | |
| 2011/0115431 A1 | 5/2011 | Dunworth | |
| 2012/0019220 A1 | 1/2012 | Grimm | |

FOREIGN PATENT DOCUMENTS

| | | |
|---|---|---|
| CN | 101114797 A | 1/2008 |
| CN | 101640481 A | 2/2010 |
| EP | 1 385 074 A2 | 1/2004 |
| EP | 1 801 959 A2 | 6/2007 |
| TW | I275232 | 3/2007 |
| TW | 201021388 | 6/2010 |
| TW | 201033784 | 9/2010 |
| TW | 201117543 | 5/2011 |
| TW | I375143 | 10/2012 |

OTHER PUBLICATIONS

Office action mailed on Jan. 14, 2015 for the China application No. 201210171503.6, p. 3-7.

Office action mailed on Mar. 6, 2014 for the Taiwan application No. 101116843, filed: May 11, 2012, p. 1 line 1-9, p. 2 line 18-26, p. 3 and p. 4 line 1-17.

Office action mailed on Oct. 10, 2015 for the China application No. 201210171503.6, p. 3-5 and p. 6 line 1-23.

\* cited by examiner

POWER SAVING METHOD AND POWER SAVING CIRCUIT THEREOF

BACKGROUND OF THE INVENTION

1. Field of the Invention

The present invention relates to a power saving method and a power saving circuit thereof, and more particularly, to a power saving method and a power saving circuit thereof which is able to be used when a system has a light load.

2. Description of the Prior Art

A technique of converting an alternating-current (AC) voltage to a direct-current (DC) voltage with a power supply is widely used in integrated electronic devices. The power supply can maintain an output voltage, current, or power within a constant range, so as to make the electronic device operating safely and efficiently. Therefore, a switched mode power supply is widely used for supplying power for many electronic apparatuses presently due to high efficiency and well-rectified output. In the switched mode power supply, the power conversion is achieved by continuously switching a switch on and off at a high frequency. In comparison with a linear power supply, the switched mode power supply can provide a better performance, because power loss can be reduced by switching the switch. When the switch is turned on, the switch has low voltage drop and passes any current imposed on it. When the switch is turned off, the switch blocks the flow of current. As a result, power dissipation in both states is relatively small.

The electronic device may be in a busy or idle state according to a user's operating condition, such that the switched mode power supply may be in a heavy or light loading state at different time. Therefore, the switched mode power supply has to provide different operation voltages according to a current loading state.

In order to achieve a higher efficiency when the system has a light load, the switched mode power supply may enter a skip mode when the system has the light load to reduce power consumption. However, power saving are considered more and more important in current electronic products. Even if entering the skip mode in the light loading state, power saving performance may still not be optimized.

SUMMARY OF THE INVENTION

It is therefore an objective of the present invention to provide a power saving circuit for an electronic device. The power saving circuit can reduce power consumption when a system circuit of the electronic system has a light load and improve system performance.

The present invention discloses a power saving circuit for an electronic device. The power saving circuit includes a direct-current (DC) power supply, a sensing unit, and a control unit. The DC power supply is used for providing a DC current. The sensing unit, coupled to the DC power supply, is used for detecting the DC current and operating to generate a voltage signal according to the DC current. The control unit, coupled to the sensing unit, is used for determining whether a system circuit of the electronic device has a light load or a heavy load according to the voltage signal and generating an enable signal.

The present invention further discloses a power saving method for an electronic device. The power saving method includes detecting a DC current; operating to generate a voltage signal according to the DC current; determining whether a system circuit of the electronic device has a light load or a heavy load according to the voltage signal and generating an enable signal; and enabling different DC switching modules according to the enable signal when a load of the system circuit varies.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
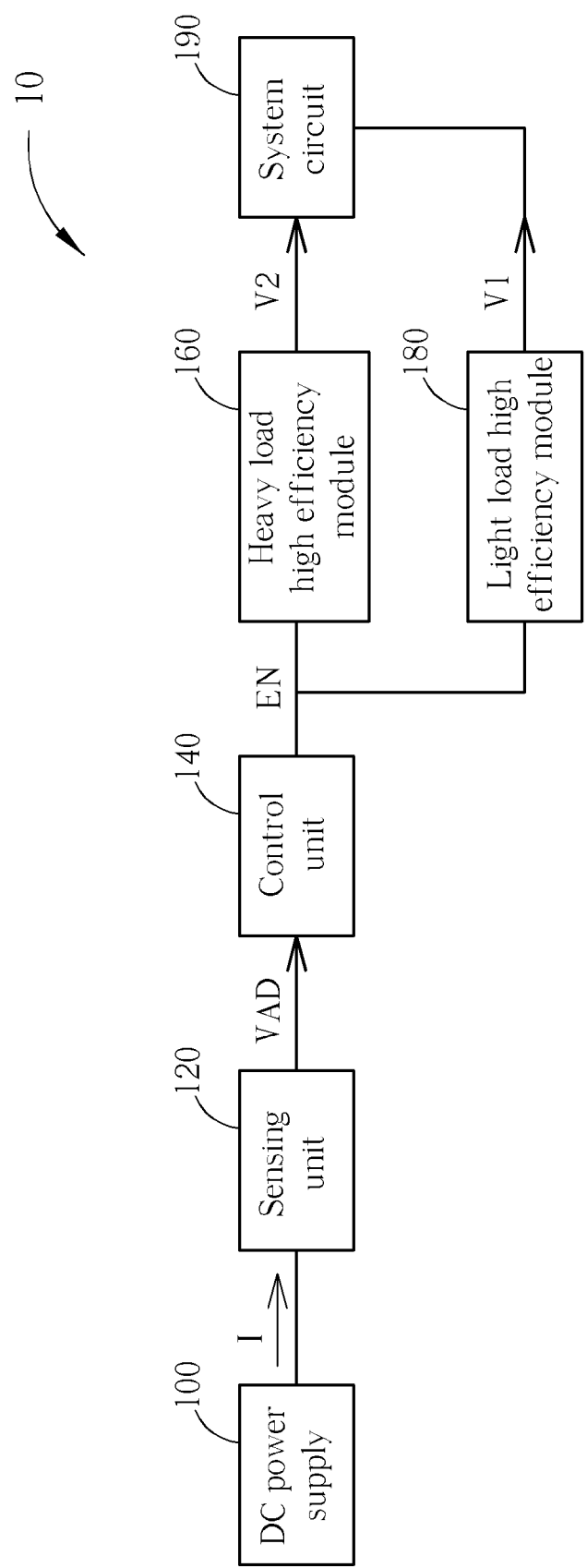
FIG. 1 is a schematic diagram of a power saving circuit according to an embodiment of the present invention.

Please refer to FIG. 1. FIG. 1 is a schematic diagram of a power saving circuit 10 according to an embodiment of the present invention. The power saving circuit 10 is used in an electronic device, for improving performance of the electronic device to achieve power saving. The electronic device can be a laptop, a server, a personal computer, or other electronic devices which need a stable input voltage. The power saving circuit 10 includes a direct-current (DC) power supply 100, a sensing unit 120, a control unit 140, a heavy load high efficiency module 160, and a light load high efficiency module 180. The heavy load high efficiency module 160 and the light load high efficiency module 180 are both coupled to a system circuit 190. The system circuit 190 can be considered a load, which is not included in the power saving circuit 10, but illustrated in FIG. 1 for easy understanding. The DC power supply 100, used for providing a DC current I, can be a transformer, a battery, or any electronic elements which provides the DC current I. The sensing unit 120, coupled to the DC power supply 100, is used for operating to generate a voltage signal VAD according to the DC current I. The control unit 140, coupled to the sensing unit 120, is used for determining whether the system circuit 190 has a light load or a heavy load according to the voltage signal VAD and generating an enable signal EN. The heavy load high efficiency module 160 and the light load high efficiency module 180, both coupled to the control unit 140, are used for providing different voltages for the system circuit 190 according to the enable signal EN.

Therefore, when the load of the system circuit 190 varies, the DC current I provided by the DC power supply 100 may also vary with the different loads. The sensing unit 120 detects the DC current I, and operates to generate the voltage signal VAD according to the DC current I. The control unit 140 compares the voltage signal VAD with a predefined value A to determine whether the system circuit 190 has the light load or the heavy load. When the voltage signal VAD is less than the predefined value A, the control unit 140 determines the system circuit 190 has the light load. When the voltage signal VAD is greater than the predefined value A, the control unit 140 determines the system circuit 190 has the heavy load. When the control unit 140 determines the system circuit 190 has the light load, the control unit 140 generates the enable signal EN to enable the light load high efficiency module 180. The light load high efficiency module 180 provides a stable voltage V1 for the system circuit 190 according to the enable signal EN. When the control unit 140 determines the system circuit 190 has the heavy load, the control unit 140 generates the enable signal EN to enable the heavy load high efficiency module 160. The heavy load high efficiency module 160 provides a stable voltage V2 for the system circuit 190 according to the enable signal EN. Preferably, the stable voltage V1 is less than the stable voltage V2. Therefore, by using the control unit 140 to determine whether the system circuit 190 has the light load or the heavy load, the power saving circuit 10 can enable the heavy load high efficiency module 160 or the light load high efficiency module 180 to provide different voltages for the system circuit 190. That is, when the system circuit 190 has the heavy load, the control unit 140 enables the heavy load high efficiency module 160 to achieve optimal DC converting efficiency; when the system circuit 190 has the light load, the control unit 140 enables the light load high efficiency module 180 to save power consumption of electronic devices and achieve optimal system performance.

Figure 2:
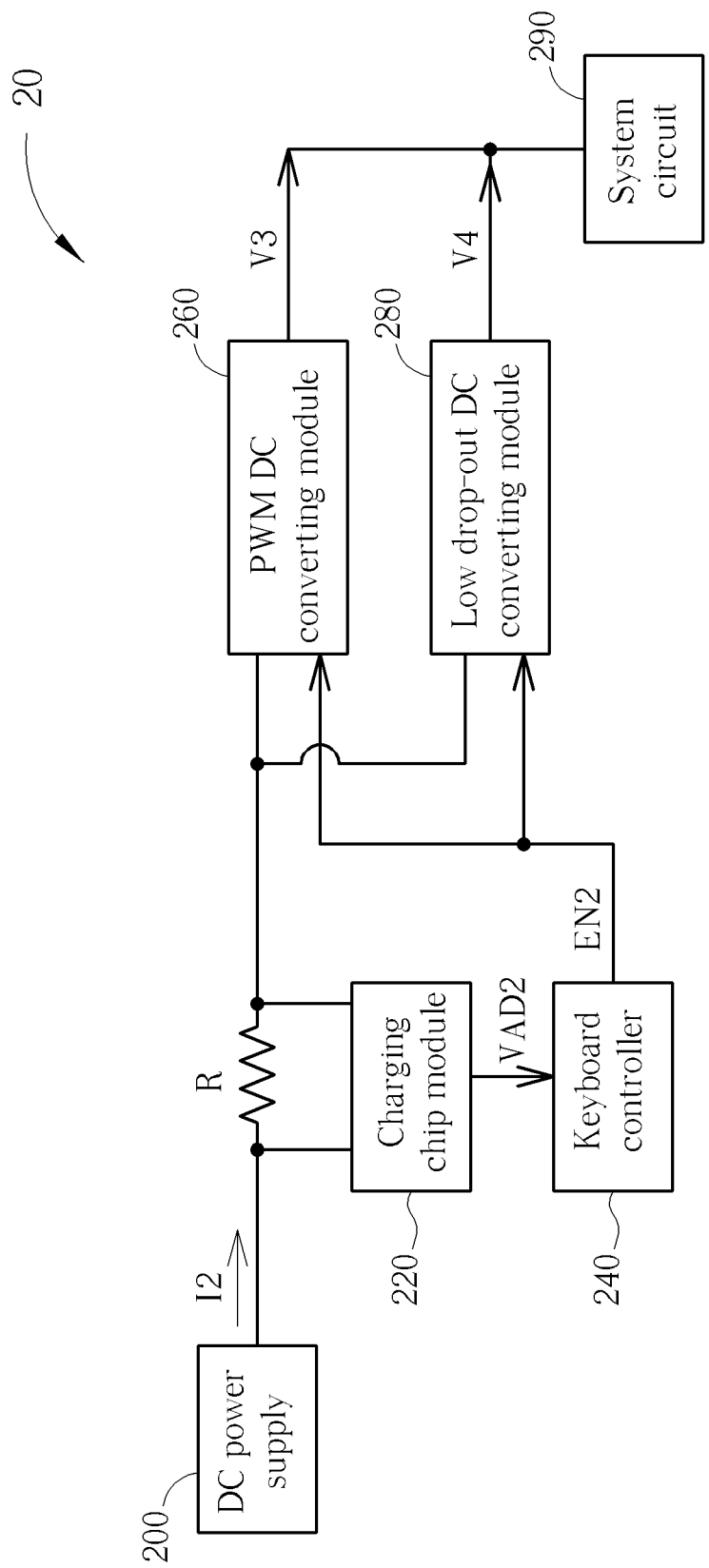
FIG. 2 is a schematic diagram of another power saving circuit according to an embodiment of the present invention.
Figure 3:
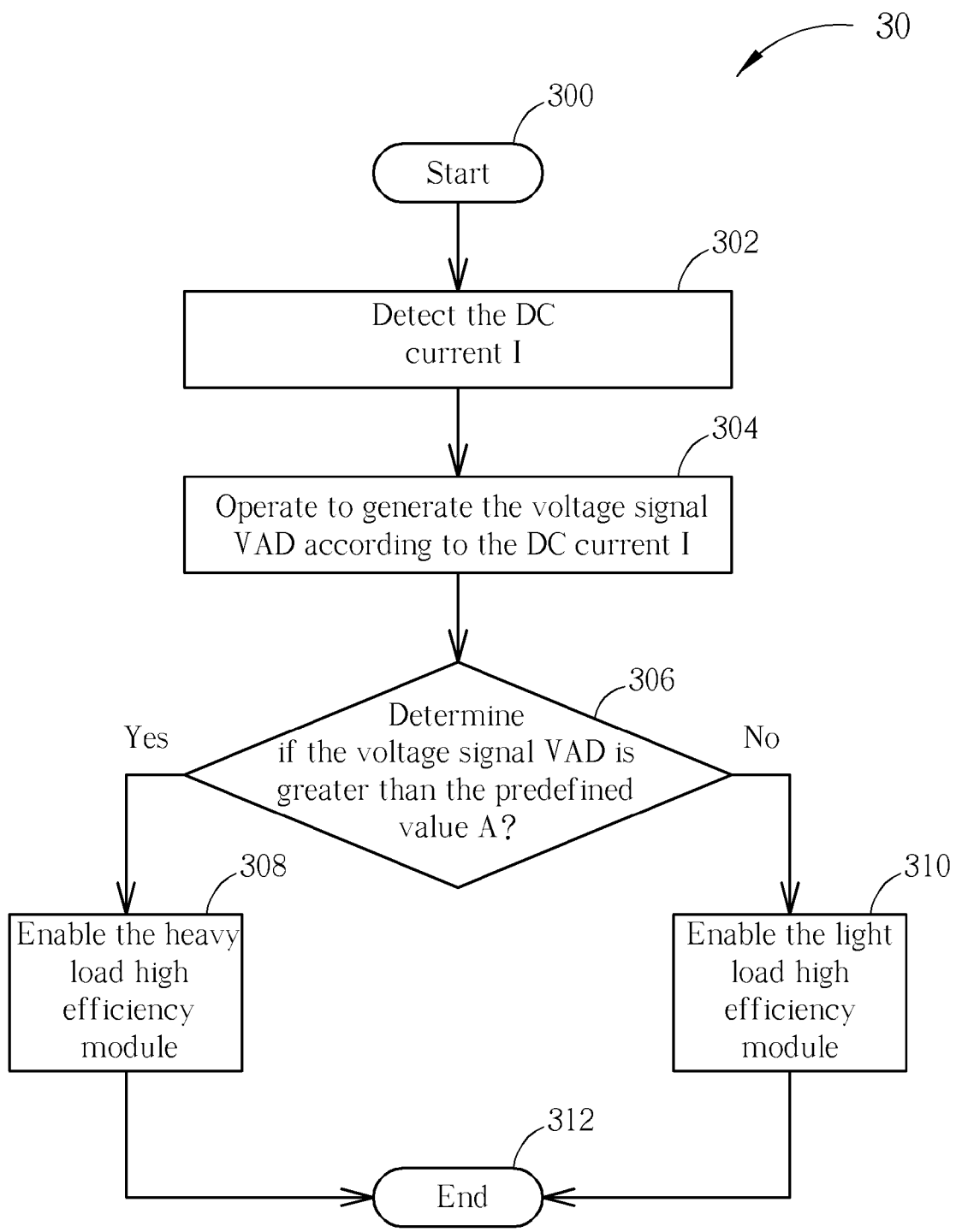
FIG. 3 is a schematic diagram of a process according to an embodiment of the present invention.

A detailed embodiment of the power saving circuit 10 can be referred to FIG. 2. FIG. 2 is a schematic diagram of a power saving circuit 20 according to another embodiment of the present invention. The structure of the power saving circuit 20 is similar to the abovementioned power saving circuit 10. The power saving circuit 20 includes a DC power supply 200, a resistor R, a charging chip module 220, a keyboard controller 240, a pulse width modulation (PWM) DC converting module 260, and a low drop-out DC converting module 280. In addition, a system circuit 290 is not included in the power saving circuit 20, but illustrated in FIG. 2 for easy understanding. The DC power supply 200 is used for providing a DC current 12. The resistor R, coupled to the DC power supply 200, is used for detecting the DC current 12 when a load of the system circuit 290 varies. The charging chip module 220, coupled to the resistor R, is used for operating to generate a voltage signal VAD2 according to the DC current 12, wherein the resistor R and the charging chip module 220 can be implemented as the sensing unit 120 in FIG. 1. The keyboard controller 240, coupled to the charging chip module 220, is used for determining whether the system circuit 290 has a light load or a heavy load according to the voltage signal VAD2 and generating an enable signal EN2. The keyboard controller 240, which is implemented as the control unit 140, can be a general purpose input/output (GPIO) or a MICRO-P embedded controller. The PWM DC converting module 260 has a better DC converting performance when the system circuit has the heavy load, and thus it can be used for implementation of the heavy load high efficiency module 160. The low drop-out DC converting module 280 is always considered a part of a low power consumption circuit due to a low voltage difference between an input and an output of the low drop-out DC converting module 280. Therefore, the low drop-out DC converting module 280 can reduce DC converting loss effectively when the system circuit has the light load, such that can be implemented as the light load high efficiency module 180 to achieve power saving. The PWM DC converting module 260, coupled to the keyboard controller 240, is used for providing a stable voltage V3 for the system circuit 290 according to the enable signal EN2 when the system circuit 290 has the heavy load. The low drop-out DC converting module 280, coupled to the keyboard controller 240, is used for providing a stable voltage V4 for the system circuit 290 according to the enable signal EN2 when the system circuit 290 has the light load. Preferably, the stable voltage V4 is less than the stable voltage V3.

When the load of the system circuit 290 varies, the DC current 12 may also vary with the different loads. The resistor R detects the DC current 12. The charging chip module 220 operates to generate the voltage signal VAD2 according to the DC current 12. The keyboard controller 240 compares the voltage signal VAD2 with the predefined value A to determine whether the system circuit 290 has the light load or the heavy load. When the voltage signal VAD2 is less than the predefined value A, the keyboard controller 240 determines the system circuit 290 has the light load. When the voltage signal VAD2 is greater than the predefined value A, the keyboard controller 240 determines the system circuit 290 has the heavy load. When the keyboard controller 240 determines the system circuit 290 has the light load, the keyboard controller 240 generates the enable signal EN2 to enable the low drop-out DC converting module 280. The low drop-out DC converting module 280 provides the stable voltage V4 for the system circuit 290 according to the enable signal EN2. When the keyboard controller 240 determines the system circuit 290 has the heavy load, the keyboard controller 240 generates the enable signal EN2 to enable the PWM DC converting module 260. The PWM DC converting module 260 provides the stable voltage V3 for the system circuit 290 according to the enable signal EN2. In some examples, the keyboard controller 240 may include a switch (not shown in FIG. 2) to switch the enable signal EN2 to be outputted to the PWM DC converting module 260 or the low drop-out DC converting module 280.

Therefore, the keyboard controller 240 determines the loading state of the system circuit 290, and enables the PWM DC converting module 260 or the low drop-out DC converting module 280 timely to achieve system performance improvement and power saving.

Noticeably, the implement methods of the heavy load high efficiency module 160 and the light load high efficiency module 180 are not limited to the PWM DC converting module 260 and the low drop-out DC converting module 280. Any circuits with high efficiency when the system circuit has the heavy load can be implemented as the heavy load high efficiency module 160, and any circuits with good power saving function when the system circuit has the light load can be implemented as the light load high efficiency module 180.

The above operation of the power saving circuit 10 can be summarized into a process 30. The process 30, for an electronic device, is used for system performance improvement and power saving. The process 30 includes the following steps:

Step 300: Start.
Step 302: Detect the DC current I.
Step 304: Operate to generate the voltage signal VAD according to the DC current I.
Step 306: Determine if the voltage signal VAD is greater than the predefined value A. If yes, go to Step 308; otherwise, go to Step 310.
Step 308: Enable the heavy load high efficiency module.
Step 310: Enable the light load high efficiency module.
Step 312: End.

According to the process 30, the power saving circuit 10 compares the voltage signal VAD with the predefined value A to determine whether the system circuit 190 has the light load or the heavy load, and selects the heavy load high efficiency module or the light load high efficiency module. Detailed implementation can be referred to the above description, and will not be narrated hereinafter.

To sum up, when the load of the system circuit varies, the DC current provided by the DC power supply varies accordingly. The sensing unit detects the DC current, and generates the voltage signal. The control unit compares the voltage signal with the predefined value to determine whether the system circuit has the light load or the heavy load. If the system circuit has the light load, the control unit generates the enable signal to enable the light load high efficiency module. If the system circuit has the heavy load, the control unit generates the enable signal to enable the heavy load high efficiency module. As a result, when the load of system circuit varies, the control unit can switch between the different DC converting modules timely for system performance improvement and power saving.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power saving circuit for an electronic device, comprising:
    a direct-current (DC) power supply, for providing a direct-current power;
    a sensing unit, coupled to the direct-current power supply, for detecting the direct-current power and operating to generate a voltage signal according to the direct-current power;
    a control unit, coupled to the sensing unit, for determining whether a system circuit of the electronic device has a light load or a heavy load according to the voltage signal and generating an enable signal;
    a heavy load high efficiency module, coupled to the control unit, for providing a first voltage to the system circuit of the electronic device according to the enable signal when the system circuit of the electronic device has the heavy load; and
    a light load high efficiency module, coupled to the control unit, for providing a second voltage to the system circuit of the electronic device according to the enable signal when the system circuit of the electronic device has the light load;
    wherein the first voltage is greater than the second voltage.

2. The power saving circuit of claim 1, wherein the control unit further compares the voltage signal with a predefined value to determine whether the system circuit of the electronic device has the light load or the heavy load.

3. The power saving circuit of claim 2, wherein the control unit determines the system circuit of the electronic device has the heavy load when the voltage signal is greater than the predefined value, and determines the system circuit of the electronic device has the light load when the voltage signal is less than the predefined value.

4. The power saving circuit of claim 1, wherein the sensing unit comprises:
    a resistor, coupled to the direct-current power supply, for detecting the direct-current power when a load of the system circuit of the electronic device varies; and
    a chip module, coupled to the resistor, for operating to generate the voltage signal according to the direct-current power.

5. The power saving circuit of claim 1, wherein the control unit is a general purpose input/output (GPIO) unit or an embedded controller.

6. A power saving method for an electronic device, the power saving method comprising:
    detecting a direct-current (DC) power;
    operating to generate a voltage signal according to the direct-current power;
    determining whether a system circuit of the electronic device has a light load or a heavy load according to the voltage signal and generating an enable signal; and
    enabling different direct-current switching modules according to the enable signal when a load of the system circuit varies;
    wherein enabling the different direct-current switching modules according to the enable signal when the load of the system circuit varies comprises enabling a heavy load high efficiency module which provides a first voltage according to the enable signal when the system circuit of the electronic device has the heavy load, and enabling a light load high efficiency module which provides a second voltage according to the enable signal when the system circuit of the electronic device has the light load;
    wherein the first voltage is greater than the second voltage.

7. The power saving method of claim 6, wherein determining whether the system circuit of the electronic device has the light load or the heavy load according to the voltage signal comprises comparing the voltage signal with a predefined value to determine whether the system circuit of the electronic device has the light load or the heavy load.

8. The power saving method of claim 7, wherein comparing the voltage signal with a predefined value to determine whether the system circuit of the electronic device has the light load or the heavy load comprises determining the system circuit of the electronic device has the heavy load when the voltage signal is greater than the predefined value, and determining the system circuit of the electronic device has the light load when the voltage signal is less than the predefined value.

* * * * *